United States Patent
Kretschmar et al.

[15] 3,679,756

[45] July 25, 1972

[54] PROCESS FOR PREPARING β-SANTALOL FROM 3-METHYLNORCAMPHOR

[72] Inventors: Herbert C. Kretschmar, Greenhills; William F. Erman, Springfield Township, Hamilton County, both of Ohio

[73] Assignee: The Procter & Gamble Company, Cincinnati, Ohio

[22] Filed: May 21, 1969

[21] Appl. No.: 826,684

[52] U.S. Cl..........................260/631.5, 252/132, 252/522, 252/539, 252/DIG. 5, 252/DIG. 16, 260/340.9, 260/468 B, 260/586 R, 260/598
[51] Int. Cl..........................................................C07c 35/28
[58] Field of Search.............................................260/631.5

[56] References Cited

UNITED STATES PATENTS 3,478,114    11/1969    Lewis et al..........................260/631.5

OTHER PUBLICATIONS

Cotonge et al. " Bull. Chim. Soc. France" Vol. 1966 pp. 374–376, 1966.

*Primary Examiner*—Leon Zitver
*Assistant Examiner*—Norman Morgenstern
*Attorney*—Richard C. Witte and Julius P. Filcik

[57] ABSTRACT

A process for preparing β-santalol, useful in perfume compositions, from 3-methylnorcamphor comprising the steps of
1. alkylating 3-methylnorcamphor with β-bromopropionaldehyde ethylene glycol acetal;
2. reacting the reaction product of Step (1) with a methylmetallic compound, such as methyllithium, followed by acid hydrolysis;
3. reacting the reaction product of Step (2) with (carbethoxyethylidene)triphenylphosphorane;
4. dehydrating the reaction product of Step (3) with a dehydrating agent, such as thionyl chloride; and
5. reducing the reaction product of Step (4) with a reducing agent, such as lithium aluminum hydride, to obtain β-santalol, and novel compounds produced therein are disclosed.

5 Claims, No Drawings

PROCESS FOR PREPARING β-SANTALOL FROM 3-METHYLNORCAMPHOR

FIELD OF THE INVENTION

This invention relates to a process for preparing β-santalol, a component of sandalwood oil, having a valuable sandalwood odor and useful in perfume compositions. The process involves a 5-step synthesis from 3-methylnorcamphor. This invention also relates to novel compounds produced as intermediates in the process for preparing β-santalol.

BACKGROUND OF THE INVENTION

East Indian sandalwood oil has heretofore been available only from East Indian sandalwood trees. This oil and various individual components of the oil are highly valued perfume bases and are used in large quantities by the perfume industry. The oil, however, is expensive and is in limited, and sometimes sporadic, supply. For this reason, a continuous effort has been made to synthesize the various components of sandalwood oil or similar synthetic materials which possess the desirable woody fragrance of sandalwood oil.

The process presented herein for preparing β-santalol from 3-methylnorcamphor represents a portion of an extensive scientific effort to obtain β-santalol, a valuable component of sandalwood oil. Other processes and intermediate compounds related to the synthesis of β-santalol are described in the following copending U.S. Pat. Applications: Herbert C. Kretschmar, Wayne I. Fanta, and William F. Erman, Ser. No. 731,653, filed May 23, 1968, for Process for Preparing 3-endo-Methylnorcamphor from 2-Methylnorborn-2-ene; Thomas W. Gibson, Herbert C. Kretschmar, and William F. Erman, Ser. No. 731,652, filed May 23, 1968 for Process for Preparing 3-Methylnorcamphor from 2-Methyl-norborn-2-ene; and Herbert C. Kretschmar and William F. Erman, Ser. No. 862,682, filed May 21, 1969 for Process for Preparing β-Santalol from 3-Methyl-norcamphor, filed concurrently herewith now U.S. Pat. No. 3,618,841.

SUMMARY OF THE INVENTION

The process of this invention for the preparation of β-santalol comprises the steps of 1. alkylating 3-methylbicyclo[2.2.1]heptan-2-one having the structural formula

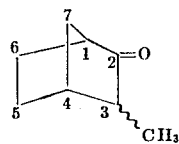

in strong base selected from the group consisting of sodium amide, lithium amide, potassium amide, sodium hydride, lithium hydride, potassium hydride, trityl sodium, trityl potassium, and trityl lithium with 2-bromo-1(2,5-dioxacyclopentyl)ethane to obtain endo-3-methyl-exo-3[2-(2,5-dioxacyclopentyl)ethyl]bicyclo[2.2.1]heptan-2-one having the structural formula

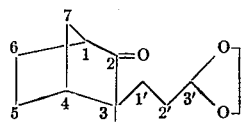

2. reacting endo-3-methyl-exo-3[2-(2,5-dioxa-cyclopentyl)ethyl]bicyclo[2.2.1]heptan-2-one of Step (1) with a methylmetallic compound selected from the group consisting of methyl-lithium and methylmagnesium bromide and subsequently hydrolyzing the reaction product in acid to obtain exo-2-endo-3-dimethyl-endo-2-hydroxy-exo-3(3'-oxopropyl)bicyclo[2.2.1]-heptane having the structural formula

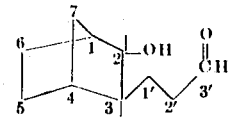

3. reacting exo-2-endo-3-dimethyl-endo-2-hydroxy-exo-3(3'-oxopropyl)bicyclo[2.2.1]-heptane of Step (2) with (carbethoxyethylidene)-triphenylphosphorane to obtain exo-2-endo-3-dimethyl-endo-2-hydroxy-exo-3-(trans-4'-carbethoxypent-3'-enyl)bicyclo[2.2.1]heptane having the structural formula

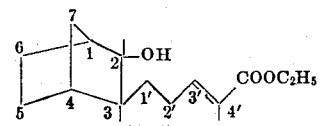

and exo-2-endo-3-dimethyl-endo-2-hydroxy-exo-3-(cis-4'-carbethoxypent-3'-enyl)bicyclo-[2.2.1]heptane having the structural formula

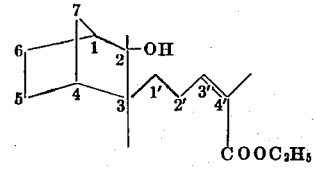

4. dehydrating exo-2-endo-3-dimethyl-endo-2-hydroxy-exo-3-(trans-4'-carbethoxypent-3'-enyl)bicyclo[2.2.1]heptane and exo-2-endo-3-dimethyl-endo-2-hydroxy-exo-3-(cis-4'-carbethoxypent-3'-enyl)bicyclo[2.2.1]heptane of Step (3) with a dehydrating agent selected from the group consisting of thionyl chloride, phosphorus oxychloride, boron trifluoride, aluminum oxide, sulfuric acid, and p-toluene sulfonic acid to obtain endo-3-methyl-exo-3-(trans-4'-carbethoxypent-3'-enyl)-2-methylenebicyclo[2.2.1]heptane having the structural formula

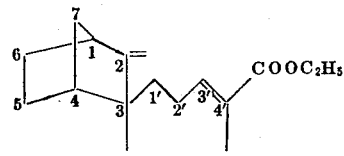

and endo-3-methyl-exo-3-(cis-4'-carbethoxypent-3'-enyl)-2-methylenebicyclo[2.2.1]heptane having the structural formula

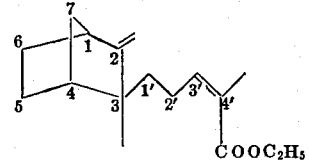

and, 5. reducing the endo-3-methyl-exo-3-(trans-4'-carbethoxypent-3'-enyl)-2-methylene-bicyclo[2.2.1]heptane and endo-3-methyl-exo-3-(cis-4'-carbethoxypent-3'-enyl)-2-methylenebicyclo[2.2.1]heptane of Step (4) with a reducing agent selected from the group consisting of lithium aluminum hydride, sodium in an alcohol solvent, potassium in an alcohol solvent, and lithium in an alcohol solvent, to obtain endo-3-methyl-exo-3-(trans-5'-hydroxy-4'-methylpent-3'-enyl)-2-methylenebicyclo[2.2.1]heptane having the structural formula

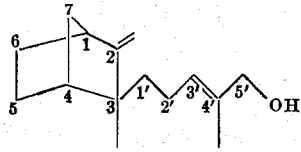

and endo-3-methyl-exo-3-(cis-5'-hydroxy-4'-methylpent-3'-enyl)-2-methylenebicyclo[2.2.1]-heptane having the structural formula

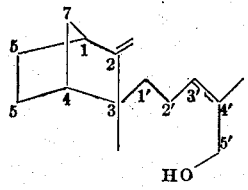

The product of the process described above is a mixture of endo-3-methyl-exo-3(cis-5'-hydroxy-4'-methyl-pent-3'-enyl)-2-methylenebicyclo[2.2.1]heptane (cis-β-santalol) and endo-3-methyl-exo-3(trans-5'-hydroxy-4'-methylpent-3'-enyl)-2-methylenebicyclo[2.2.1]heptane (trans-β-santalol). As used herein the term β-santalol without the designation cis or trans is intended to refer to the mixture of the two geometric isomers. β-Santalol possesses a desirable, woody sandalwood fragrance and, thus, has utility as a perfume per se and is useful as a component in perfume compositions. The cis-isomer and the trans-isomer can be separated and are individually useful as odorants per se and as components in perfume compositions. In addition the intermediates produced in the above process are novel compounds and some of the intermediates are useful as odorants per se having a distinctive fragrance in addition to their utility as intermediates in the process of this invention.

In the process described above, the reactants used and the products obtained are described using I.U.P.A.C. (International Union of Pure and Applied Chemistry) nomenclature. Because of the length of the I.U.P.A.C. names describing the starting materials, intermediates and the reaction products of the above process, trivial nomenclature will be used hereinafter in the discussions of the process of this invention in order to simplify the disclosure to follow. I.U.P.A.C. nomenclature is used in the examples given hereinafter. The trivial names used in the description of the process of this invention which are associated with each of the above I.U.P.A.C. names are shown in the following table:

| I.U.P.A.C. Name | Trivial Name |
|---|---|
| 3-methylbicyclo[2.2.1]-heptan-2-one (endo and exo isomers) | 3-methylnorcamphor (endo and exo isomers) |
| 2-bromo-1(2,5-dioxacyclopentyl)ethane | β-bromopropionaldehyde ethylene glycol acetal |
| endo-3-methyl-exo-3[2'-(2,5-dioxacyclopentyl ethyl]bicyclo[2.2.1]heptan-2-one | endo-3-methyl-3-oxapropyl ethylene glycol acetal norcamphor |
| exo-2-endo-3-dimethyl-endo-2-hydroxy-exo-3(3'-oxopropyl)bicyclo[d2.2.1]-heptane | 8-oxoethyl epi-camphene hydrate |
| exo-2-endo-3-dimethyl-endo-2-hydroxy-exo-3-(trans-4'-carbethoxypent-3'-enyl)bicyclo[2.2.1]-heptane | trans-ethyl-β-santalate epi-hdyrate |
| exo-2-endo-3-dimethyl-endo-2-hydroxy-exo-3-(cis-4'-carbethoxypent-3'-enyl)bicyclo[2.2.1]-heptane | cis-ethyl-β-santalate epi-hydrate |
| endo-2-methyl-exo-(trans-4'-carbethoxypent-3'-enyl)-2-methylenebicyclo-[2.2.1]heptane | trans-ethyl-β-santalate |
| endo-3-methyl-exo-3-(cis-4'-carbethoxypent-3'-enyl)-2-methylenebicyclo[2.2.1]-heptane | cis-ethyl-β-santalate |
| endo-3-methyl-exo-3-(trans-5'-hydroxy-4'-methyl-pent-3'-enyl)-2-methylenebicyclo[2.2.1]heptane | trans-β-santalol |
| endo-3-methyl-exo-3-(cis-5'-hydroxy-4'-methylpent-3'-enyl)-2-methylenebicyclo-[2.2.1]heptane | cis-β-santalol |

DETAILED DESCRIPTION OF THE INVENTION

STARTING MATERIAL

The initial starting material, 3-methylnorcamphor, and processes for preparing the starting material, are described in the following copending U.S. Pat. Applications: Herbert C. Kretschmar, Wayne I. Fanta, and William F. Erman, Ser. No. 731,653, filed May 23, 1968, for Process for Preparing 3-endo-Methylnorcamphor from 2-Methylnorborn-2-ene; and Thomas W. Gibson, Herbert C. Kretschmar, and William F. Erman, Ser. No. 731,652, filed May 23, 1968, for Process for Preparing 3-Methylnorcamphor from 2-Methyl-norborn-2-ene.

The starting material, i.e., 2-methylnorborn-2-ene, for use in the processes described by Kretschmar, Fanta, and Erman, supra, and by Gibson, Kretschmar, and Erman, supra, can be advantageously and cheaply prepared by the method generally described by Alder and Ache, in Chem. Ber., 95, 503–10 (1962), by which methylcyclopentadiene and ethylene, both of which are commercially available, are condensed under high temperatures and pressures to form 2-methylnorborn-2-ene. Generally, a large molar excess of ethylene, e.g., 2 to 50 moles of ethylene per mole of methylcyclopentadiene, is utilized with the methylcyclopentadiene. The reaction time, although dependent on the reaction conditions and molar ratios of reactants, generally ranges from about 1 hour to about 10 hours at ordinary reaction conditions of temperatures ranging from about 100° to about 400° C. and ethylene pressures ranging from about 1,000 psi to 5,000 psi.

In the process described by Gibson, Kretschmar, and Erman, supra, 2-methylnorborn-2-ene is reacted with a dialkyl aluminum hydride to obtain 2-exo-dialkylalumino-3-endo-methylnorbornane. Suitable dialkyl aluminum hydrides are diisobutyl aluminum hydride, dibutyl aluminum hydride, and dipentyl aluminum hydride. The 2-exo-dialkylalumino-3-endo-methylnorbornane is oxidized with oxygen gas to obtain 3-endo-methylnorborneol and finally the 3-endo-methylnorborneol is oxidized with a strong oxidizing agent, such as chromium trioxide, potassium permanganate, t-butyl chromate, or potassium dichromate, to obtain 3-methylnorcamphor which is a mixture of isomers, i.e., 3-exo-methyl-norcamphor and 3-endo-methylnorcamphor. The temperatures, reaction conditions and molar ratios, etc., are described more fully in the hereinbefore cited copending patent application.

In the process described by Kretschmar, Fanta, and Erman, supra, 2-methylnorborn-2-ene (obtainable from the reaction of ethylene and methylcyclopentadiene as described above) is reacted with a peracid, such as performic acid, perbenzoic acid or peracetic acid, to obtain the epoxide, 2-endo-methyl-2,3-exo-epoxynorbornane. The epoxide is then reacted with a catalytic amount of an acid, e.g., oxalic acid, hydrogen bromide or hydrogen chloride, or a Lewis acid, such as aluminum chloride, boron trifluoride, or stannic chloride. The reaction product is 3-endo-methylnorcamphor.

The starting material for use in the process of this invention, 3-methylnorcamphor, can also be prepared according to the method described by Corey, Hartman and Vatakencherry in J. Am. Chem. Soc., 84, 2611 (1962) in which 3-methylnorcamphor is utilized in preparing one of the hydrocarbon components of East Indian sandalwood oil. In this process 3-methylnorcamphor is described as a useful and necessary intermediate prepared from norcamphor "...by reaction of an ethereal solution of the sodium enolate [of norcamphor] generated from sodium amide or trityl sodium on the ketone [norcamphor] with excess methyl iodide...".

β-Bromopropionaldehyde ethylene glycol acetal can be prepared by bubbling HBr into a solution containing acrolein and ethylene glycol, both commercially available, under nitrogen and at a temperature of about 25° C.

STEP (1)

The first step of the process of this invention comprises alkylating 3-methylnorcamphor with β-bromopropion-aldehyde ethylene glycol acetal having the formula

to obtain endo-3-methyl-3-oxapropyl ethylene glycol acetal norcamphor according to the following:

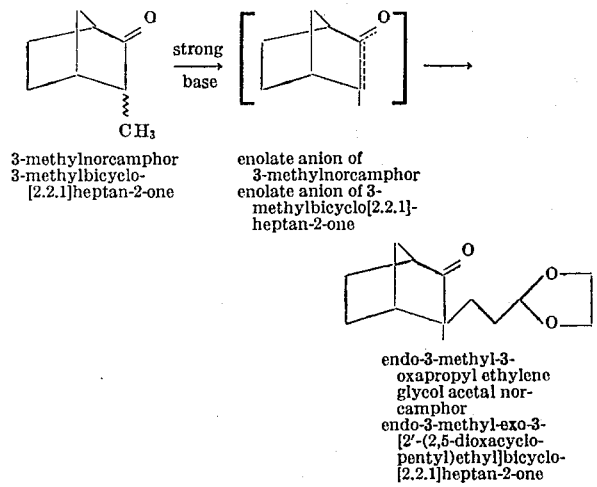

3-methylnorcamphor
3-methylbicyclo-
[2.2.1]heptan-2-one enolate anion of
3-methylnorcamphor
enolate anion of 3-
methylbicyclo[2.2.1]-
heptan-2-one endo-3-methyl-3-
oxapropyl ethylene
glycol acetal norcamphor
endo-3-methyl-exo-3-
[2'-(2,5-dioxacyclopentyl)ethyl]bicyclo-
[2.2.1]heptan-2-one This alkylation reaction proceeds through the enolate anion of 3-methylnorcamphor. The enolate anion of 3-methyl-norcamphor is formed by treating the starting material, 3-methylnorcamphor, with a strong base. Suitable such strong bases are trityl sodium, trityl potassium, trityl lithium, sodium hydride, lithium hydride, potassium hydride, potassium amide, lithium amide, and sodium amide. Sodium hydride and sodium amide are the preferred strong bases for use in forming the enolate anion of 3-methylnorcamphor. The strong base is generally used in a molar ratio of 3-methyl-norcamphor to strong base of from about 1:1 to about 1:1.5, preferably from about 1:1.05 to about 1:1.1.

In the formation of the enolate anion normally the 3-methylnorcamphor is dissolved in a solvent (such as an aromatic hydrocarbon solvent, an ether solvent or an aliphatic hydrocarbon solvent) under an inert atmosphere.

Suitable aromatic hydrocarbon solvents for use in dissolving the 3-methylnorcamphor are toluene, xylene and benzene, with toluene and xylene being preferred. Suitable ether solvents are diethyl ether, dimethyl ether, methyl-ethyl ether, dibutyl ether, tetrahydrofuran, 1,2-dimethoxy-ethane, and dioxane, with tetrahydrofuran being preferred. Suitable aliphatic hydrocarbon solvents are pentane, hexane, heptane, octane, cyclopentane, cyclohexane, and cyclooctane. The solvent used, examples of which are listed above, is preferably anhydrous. If the solvent used is not anhydrous, the strong base will preferentially react with the water contained in the solvent and thus the yield of the enolate anion of 3-methylnorcamphor is reduced. Suitable inert gases for protection against moisture in the air are argon, helium and nitrogen, with nitrogen being preferred.

The strong base and the 3-methylnorcamphor are allowed to stand, with stirring, at from about 80° to about 130° C. and where an anhydrous solvent is used, the formation of the enolate anion of 3-methylnorcamphor normally is completed after about four to about five hours. Where desired the formation of the enolate anion of 3-methyl-norcamphor can be monitored by observing the rate of hydrogen evolution formed in the treatment of 3-methyl-norcamphor with strong base. The weight ratio of 3-methylnorcamphor to solvent used generally ranges from about 1:2 to about 1:10, with from about 1:3 to about 1:7 being preferred.

After the enolate ion of 3-methylnorcamphor is formed, β-bromopropionaldehyde ethylene glycol acetal is then added to the mixture containing the enolate anion of 3-methyl-norcamphor. The ratio of 3-methylnorcamphor to the β-bromopropionaldehyde ethylene glycol acetal used is not a critical consideration but generally a slight excess of β-bromopropionaldehyde ethylene glycol acetal is used in order to insure that all of the 3-methylnorcamphor is converted in Step (1). Molar ratios of about 2:1 to about 1:5 of 3-methylnorcamphor to β-bromopropionaldehyde ethylene glycol acetal are suitable, with about 1:1.05 to about 1:1.1 being preferred.

The temperature at which the enolate anion of 3-methylnorcamphor is reacted with the β-bromopropionaldehyde ethylene glycol acetal normally can range from about 30° to about 170° C., with the preferred range being from about 80° to about 130° C. The reaction of the β-bromopropion-aldehyde ethylene glycol acetal with the enolate anion of 3-methylnorcamphor is fairly rapid and the period of addition of the β-bromopropionaldehyde ethylene glycol acetal to the solution containing the 3-methylnorcamphor enolate anion can range from about five minutes to about ten hours. The reaction is quite exothermic and a large amount of heat is generated due to the reaction of the β-bromopropionaldehyde ethylene glycol acetal with the enolate anion of 3-methylnorcamphor. As a result the β-bromopropionaldehyde ethylene glycol acetal is usually added dropwise, with stirring, to the solution containing the enolate anion of 3-methylnorcamphor prepared from 3-methylnorcamphor and a strong base. The β-bromopropionaldehyde ethylene glycol acetal can be added as a pure material or in a solution of one of the above-mentioned solvents. Where a solvent is used the β-bromopropionaldehyde ethylene glycol acetal/solvent mixture is added dropwise, with stirring, to the solution containing the anion of 3-methylnorcamphor. Where the β-bromopropionaldehyde ethylene glycol acetal is dissolved in one of the above solvents, the weight ratio of β-bromopropionaldehyde ethylene glycol acetal to solvent generally ranges from about 1:2 to about 1:10, preferably from about 1:3 to 1:7.

The time of the reaction of the β-bromopropionaldehyde ethylene glycol acetal with the enolate anion of 3-methyl-norcamphor will depend upon the temperature at which the reaction is run and the solution concentration which is used. With lower temperatures and lower concentrations the reaction will be slow and at higher temperatures and higher concentrations the reaction will be faster. Where the β-bromopropionaldehyde ethylene glycol acetal is dissolved in a solvent in the above-mentioned concentration, and added dropwise, and the temperature of reaction is controlled in the preferred range of from about 80° to about 130° C., the reaction time normally is from about 30 minutes to about 5 hours with high yields being obtained.

In this step of the process of the invention an inert atmosphere such as nitrogen, argon, or helium is generally used in order to protect the reactants from moisture in the atmosphere.

The starting material, 3-methylnorcamphor, exists in two stereoisomeric forms—one where the methyl group is endo in the bicyclic ring system (i.e., cis to the two-carbon atom bridge) and the second where the methyl group is exo in the bicyclic ring system (i.e., trans to the two-carbon atom bridge). The use of strong base converts both of these isomers to the enolate anion of 3-methylnorcamphor, which is a planar intermediate. Either endo-3-methylnorcamphor or exo-3-methylnorcamphor, or mixtures of the two isomers, can be used as the starting material in the process of this invention even though the side chain of the product of the process of this invention, β-santalol, has a specific stereochemical orientation. The addition of the β-bromopropionaldehyde ethylene glycol acetal to the planar enolate anion occurs from the exo face of the bicyclic structure regardless of the starting material because of steric hindrance to endo addition. As a result the side-chain stereochemistry necessary for the formation of the β-santalol end product of this process is assured.

The product of Step (1) of the process of this invention, endo-3-methyl-3-oxapropyl ethylene glycol acetal norcamphor is a novel compound and is useful as an intermediate in the process for preparing β-santalol.

STEP (2)

The reaction product of Step (1) of the process of this invention, endo-3-methyl-3-oxapropyl ethylene glycol acetal norcamphor, is used as the starting material in Step (2) of the process of this invention. In Step (2) endo-3-methyl-3-oxapropyl ethylene glycol acetal norcamphor is reacted with a methylmetallic compound selected from the group consisting of methyllithium and methylmagnesium bromide followed by acid hydrolysis to form 8-oxaethyl epi-camphene hydrate according to the following:

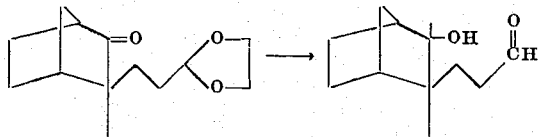

endo-3-methyl-3-oxapropyl
ethylene glycol acetal
norcamphor
endo-3-methyl-exo-3[2'-(2,5-dioxacyclopentyl)ethyl]-bicyclo[2.2.1]heptan-2-one 8-oxoethyl epi-camphene hydrate
exo-2-endo-3-dimethyl-endo-2-hydroxy-exo-3(3'-oxopropyl)-bicyclo[2.2.1]heptane In Step (2) of the process of this invention the methyl-lithium or methylmagnesium bromide reacts with the carbonyl group of the starting material and after acid hydrolysis the hydroxy aldehyde, 8-oxoethyl epi-camphene hydrate, is formed. The reaction is a high yield reaction and the reactants are generally used in the molar ratio of endo-3-methyl-3-oxapropyl ethylene glycol acetal norcamphor to methylmetallic, of from about 1:1 to about 1:5. Preferably a slight excess, e.g., from about 1:1.05 to about 1:1.1, of the methylmetallic compound is used to assure complete conversion of the starting material.

In this step of the process of this invention the endo-3-methyl-3-oxapropyl ethylene glycol acetal norcamphor is generally dissolved in an anhydrous solvent. Suitable solvents are ether solvents such as diethyl ether, methyl-ethyl ether, dibutyl ether, tetrahydrofuran, 1,2-dimethoxy-ethane, and dioxane; aromatic hydrocarbon solvents such as benzene, toluene, and xylene; and aliphatic hydrocarbon solvents such as pentane, hexane, heptane, octane, cyclopentane, cyclohexane, and cyclooctane. Ether solvents are generally preferred with diethyl ether being especially preferred. Use of diethyl ether as the solvent is advantageous because methyllithium is commercially available in diethyl ether and the methylmagnesium bromide is usually prepared in diethyl ether. The starting material, endo-3-methyl-3-oxapropyl ethylene glycol acetal norcamphor, is generally used in a weight ratio to solvent of from about 1:2 to about 1:20, preferably from about 1.5 to about 1:10. The reaction occurring in Step (2) is quite exothermic and the use of more dilute solutions, e.g., 1:5, facilitates temperature control during the reaction.

The temperature of the reaction is not critical and can generally range from about 0° to about 30° C. The reaction essentially is instantaneous and the reaction time is dependent upon the reaction conditions and the amount of reactants used. Generally, the time for reaction ranges from about 1 hour to about 10 hours. During the course of the reaction the reaction mixture is stirred continuously as the solution containing the methylmetallic compound is added dropwise to the solution containing the starting material, endo-3-methyl-3-oxapropyl ethylene glycol acetal norcamphor. The order of addition of the reactants is not important and the solution containing the methylmetallic compound can be added directly to the solution containing the endo-3-methyl-3-oxapropyl ethylene glycol acetal norcamphor or vice versa. Generally an inert atmosphere is used in order to prevent the methylmetallic compound from coming in contact with water or oxygen. Suitable inert atmospheres are argon, nitrogen, and helium. Argon or nitrogen is preferred.

Once the reaction of endo-3-methyl-3-oxapropyl ethylene glycol acetal norcamphor with the methylmetallic compound is completed, the intermediate lithium alkoxide salt or the magnesium bromide salt and the acetal group are converted to the alcohol and the aldehyde functional group, respectively, by the addition of from about 0.1 to about 2 moles of any acid in aqueous solution, e.g., a mineral acid or organic acid such as HCl, HBr, $H_2SO_4$, and $CH_3COOH$ at an aqueous solution concentration of from about 5 percent by weight to about 20 percent by weight. The amount of acid required will be dependent on the amount of starting material and methylmetallic compound used. Only that amount of acid will be needed to accomplish the conversion to the alcohol group and to hydrolyze the acetal group. This generally can be accomplished by adding sufficient acid to make the reaction mixture acidic. Where desired a small amount of water can be added to hydrolyze the lithium alkoxide or magnesium bromide salt to the alcohol followed by addition of an aqueous acid solution as above to hydrolyze the acetal to the aldehyde.

The product of Step (2) of the process of this invention, 8-oxoethyl epi-camphene hydrate, is a novel compound. The reaction product of Step (2) is used as the starting material in Step (3) of the process for preparing β-santalol. In addition to being valuable as the starting material in Step (3), 8-oxoethyl epicamphene hydrate is useful as an odorant per se, having a sweet, camphor odor. 8-Oxoethyl epi-camphene hydrate produced in Step (2) can be purified by conventional methods, e.g., distillation, and used in perfume compositions where an odorant having these odor characteristics is desired.

STEP (3)

Step (3) of the process of this invention involves the reaction of 8-oxoethyl epi-camphene hydrate produced as the reaction product of Step (2) with (carbethoxy-ethylidene)triphenylphosphorane. (Carbethoxyethylidene)-triphenylphosphorane has the following formula

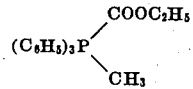

and reacts with the starting material in this step of the reaction in a Wittig reaction. The reaction of 8-oxoethyl epi-camphene hydrate with the above phosphorane results in the formation of a mixture of the cis and trans isomers of ethyl-β-santalate epi-hydrate according to the following:

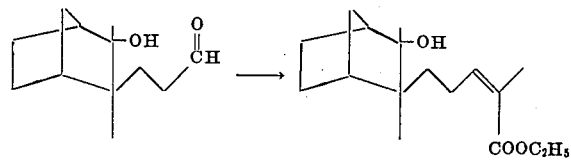

8-oxoethyl epi-camphene
 hydrate
exo-2-endo-3-dimethyl-endo-
 2-hydroxy-exo-3(3'-oxopropyl)-
 bicyclo[2.2.1]heptane ethyl-β-santalate epi-hydrate
 (cis and trans isomers)
exo-2-endo-3-dimethyl-endo-2-
 hydroxy-exo-3-(4'-carbethoxypent-
 3'-enyl)bicyclo[2.2.1]heptane
 (cis and trans isomers)

An olefinic double bond is formed in the side chain of the product produced in the above step resulting in the formation of both cis-ethyl-β-santalate epi-hydrate and trans-ethyl-β-santalate epi-hydrate. The cis and trans isomers are shown as follows:

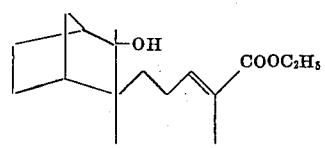

trans-ethyl-β-santalate
 epi-hydrate
exo-2-endo-3-dimethyl-endo-
 2-hydroxy-exo-3-(trans-4'-
 carbethoxypent-3'-enyl)-
 bicyclo[2.2.1]heptane

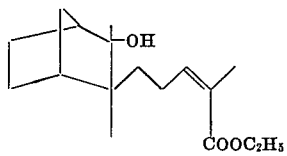

cis-ethyl-β-santalate
 epi-hydrate
exo-2-endo-3-dimethyl-endo-2-
 hydroxy-exo-3-(cis-4'-carbethoxy-
 pent-3'-enyl)bicyclo[2.2.1]heptane In Step (3) in which the phosphorane is reacted with 8-oxoethyl epi-camphene hydrate, the reactants are normally used in a molar ratio of 8-oxoethyl epi-camphene hydrate to phosphorane of from about 1:1 to about 1:5, preferably from about 1:1 to about 1:2. Generally, an excess of the phosphorane, e.g., 1:2, is used in order to insure that all of the hydroxy aldehyde, 8-oxoethyl epi-camphene hydrate, is converted to the ester. The Wittig reaction is a well known reaction and is described by G. Wittig and M. Schoellkopf, *Org. Syn.*, 40, 66 (1960), and by H. O. House, *Modern Synthetic Reactions*, pp. 245–256, W. A. Benjamin, Inc., New York (1965).

A solvent is used in Step (3). Suitable solvents are the chlorinated hydrocarbons, such as methylene chloride, chloroform, carbon tetrachloride, and 1,2-dichloroethane; alcohols such as ethanol, methanol, propanol, iso-propanol, butanol, and pentanol; polyols such as ethylene glycol, propylene glycol, and glycerol; and ether solvents such as diethyl ether, methylethyl ether, dimethyl ether, dibutyl ether, tetrahydrofuran, 1,2-dimethoxyethane, and dioxane. Alcohols are preferred as the solvents for use herein and ethanol is especially preferred. The starting material, 8-oxoethyl epi-camphene hydrate, is generally used in a weight ratio to solvent of from about 1:2 to about 1:20, preferably from about 1:5 to about 1:10.

The temperature of the reaction can range from about 0° to about 50° C. The reaction is generally run at about room temperature, e.g., from about 20° to about 30° C. The time of the reaction depends upon the concentrations of the reactants and the reaction temperature and generally ranges from about 1 hour to 36 hours, more normally from about 12 hours to about 16 hours. Solvent mixtures of the two reactants are simply prepared, poured together, stirred, and allowed to react for the period described above. It is not necessary in this step of the reaction to use an inert atmosphere, although it may be employed if desired.

As has hereinbefore been described, Step (3) of the process of this invention involves the reaction of 8-oxoethyl epi-camphene hydrate with the phosphorane and results in the formation of an unsaturated ester. The unsaturation gives rise to two geometric isomers, cis-ethyl-β-santalate epi-hydrate and trans-ethyl-β-santalate epi-hydrate. The mixture of these two isomers has a woody reminiscence of sandalwood oil and is useful as an odorant per se or in perfume compositions. Where desired the cis- and trans-isomers can be separated by conventional methods, e.g., distillation, gas or column chromatography, and used separately as odorants per se. The cis- and trans-isomers, separately or as a mixture, prepared as the product of Step (3), also have utility as the starting material in Step (4).

STEP (4)

Step (4) of the process of this invention involves the dehydration of the reaction product of Step (3), the mixture of the cis and trans isomers of ethyl-β-santalate epi-hydrate, with a dehydrating agent to form a mixture of cis-ethyl-β-santalate and trans-ethyl-β-santalate according to the following:

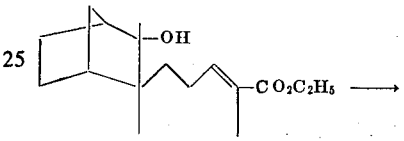

ethyl-β-santalate epi-hydrate
 (cis and trans isomers)
exo-2-endo-3-dimethyl-endo-2-
 hydroxy-exo-3-(4'-carbethoxy-
 pent-3'-enyl)bicyclo[2.2.1]-
 heptane
 (cis and trans isomers)

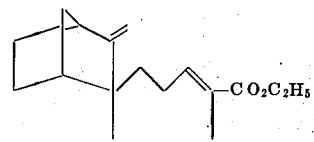

ethyl-β-santalate
 (cis and trans isomers)
endo-3-methyl-exo-3-(4'-car-
 bethoxy-3'-enyl)-2-methylene-
 bicyclo[2.2.1]heptane
 (cis and trans isomers)

Suitable dehydrating agents for use in Step (4) of the process of this invention are thionyl chloride, phosphorus oxychloride, boron trifluoride, aluminum oxide, sulfuric acid and p-toluene sulfonic acid. Any of these dehydrating agents can be used to transform the hydroxyl group into a methylene group. The dehydrating agents are normally used in the molar ratio of ethyl-β-santalate epi-hydrate to dehydrating agent of from about 100:1 to about 1:20, preferably from about 1:1 to about 1:10.

The dehydrating step, Step (4), of the process of this invention is run in an anhydrous solvent. Suitable anhydrous solvents for use with thionyl chloride, phosphorus oxychloride, aluminum oxide, sulfuric acid and p-toluene sulfonic acid are halogenated hydrocarbons, such as carbon tetrachloride, chloroform, methylene chloride, and 1,2-dichloro-ethane; aromatic hydrocarbon solvents, such as benzene, toluene, and xylene; aliphatic hydrocarbon solvents, such as pentane, hexane, heptane, octane, cyclopentane, cyclohexane, and cyclooctane; and ether solvents, such as diethyl ether, methylethyl ether, dibutyl ether, tetrahydrofuran, 1,2-dimethoxy-ethane, and dioxane. The halogenated hydrocarbon solvents are preferred for use with these dehydrating agents and of these methylene chloride is preferred. The above-mentioned solvents are also suitable for use with boron trifluoride. Where boron trifluoride is used as the dehydrating agent ether solvents are preferred. Where thionyl chloride is used, pyridine can be used as a solvent or with one of the above solvents. Thionyl chloride is preferred as the dehydrating agent. Thionyl chloride with pyridine is especially preferred as the dehydrating agent. The starting material, ethyl-β-santalate epi-hydrate, is generally used in a weight ratio to the solvent of from about 1:0.5 to about 1:50, preferably from about 1:5 to about 1:20.

The temperature of this step of the reaction will in general be dependent upon the type of dehydrating agent and the solvent used, but normally ranges from about −20° to about 50° C. With thionyl chloride, phosphorus oxychloride, aluminum oxide, sulfuric acid and p-toluene sulfonic acid, in any of the above mentioned solvents, the temperature of the reaction can range from about −20° to about 20° C. With these dehydrating agents it is preferred that the dehydrating step be run at about 0° C. for high yields. When boron trifluoride is used in an ether solvent as the dehydrating agent, a higher temperature of from about 25° to about 50° C., (generally the reflux temperature of the boron trifluoride/ether/starting material mixture) is used. Neither the dehydrating agent used nor the solvent employed is a critical consideration in this step of the process and the dehydrating agent and solvent can be selected on the basis of convenience. The time of the reaction generally ranges from about 30 minutes to about 3 hours, again depending upon the reaction conditions and concentrations used. More normally the reaction time ranges from about one hour to about two hours. The dehydrating agent of Step (4) is usually conducted under an inert atmosphere such as argon, helium, or nitrogen, to prevent the contacting of moisture from the atmosphere.

In this step of the process of this invention again an olefinic double bond exists in the side chain of the product, with both cis-ethyl-β-santalate and trans-ethyl-β-santalate being obtained. The cis and trans isomers are shown as follows:

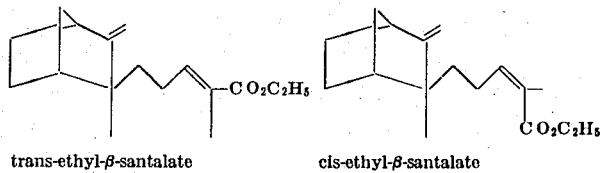

trans-ethyl-β-santalate    cis-ethyl-β-santalate

The above two geometric isomers, cis-ethyl-β-santalate and trans-ethyl-β-santalate, are useful compounds. The mixture of these two isomers has a sweet, spicy odor and is useful as an odorant per se or in perfume compositions. Where desired the cis- and trans-isomers can be separated by conventional methods, e.g., distillation and column chromatography, and used separately as odorants per se. The cis- and trans-isomers, separately, or as a mixture, prepared as the product of Step (4), also have utility as the starting material in Step (5), the last step of the process of this invention.

STEP (5)

The last step of the process of this invention, Step (5), involves the reduction of the mixture of cis-and trans-isomers of ethyl-β-santalate, formed in Step (4), with a reducing agent such as lithium aluminum hydride, sodium in an alcohol solvent, potassium in an alcohol solvent, and lithium in an alcohol solvent. A mixture of cis- and trans-alcohols, cis-β-santalol and trans-β-santalol, is obtained according to the following:

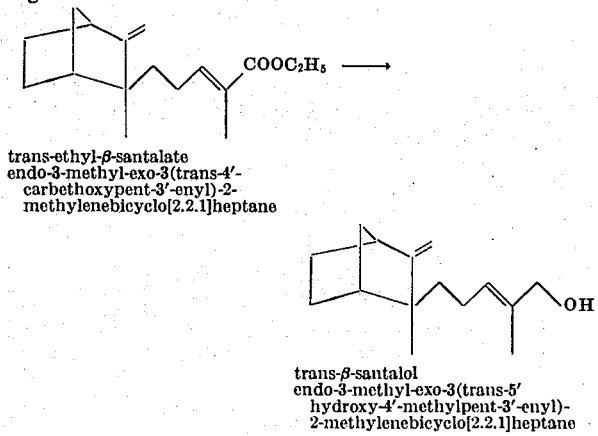

trans-ethyl-β-santalate
endo-3-methyl-exo-3(trans-4′-carbethoxypent-3′-enyl)-2-methylenebicyclo[2.2.1]heptane trans-β-santalol
endo-3-methyl-exo-3(trans-5′-hydroxy-4′-methylpent-3′-enyl)-2-methylenebicyclo[2.2.1]heptane

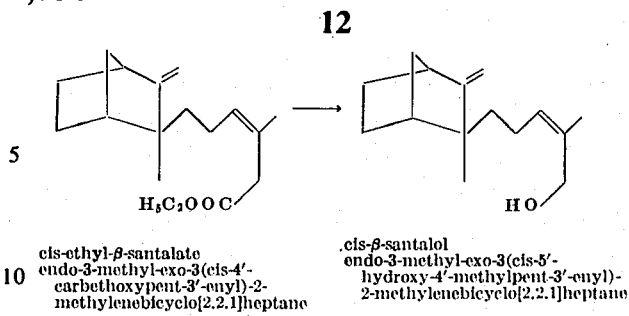

cis-ethyl-β-santalate
endo-3-methyl-exo-3(cis-4′-carbethoxypent-3′-enyl)-2-methylenebicyclo[2.2.1]heptane cis-β-santalol
endo-3-methyl-exo-3(cis-5′-hydroxy-4′-methylpent-3′-enyl)-2-methylenebicyclo[2.2.1]heptane In Step (5) of the process of this invention the reactants are generally used in equivalent amounts. Since lithium aluminum hydride has four available hydrogens for use in the reduction reaction, the molar ratio of ethyl-β-santalate (cis and trans mixture) to lithium aluminum hydride can range from about 1:0.20 to about 1:0.35. For high yields, it is preferred that a 1:0.25 molar ratio be used. An excess of lithium aluminum hydride is not preferred because the conjugated double bond can in addition be reduced resulting in the formation of side products. Where sodium, potassium, or lithium in an alcohol solvent is used as the reducing agent the molar ratio of ethyl-β-santalate to reducing agent can range from about 1:1 to about 1:1.5, preferably equivalent amounts, e.g., 1:1.

An anhydrous solvent is used in Step (5) of the process of this invention. Where lithium aluminum hydride is used as the reducing agent suitable such solvents are ether solvents, such as diethyl ether, methylethyl ether, dibutyl ether, tetrahydrofuran, 1,2-dimethoxyethane, and dioxane; aliphatic hydrocarbon solvents, such as pentane, hexane, heptane, octane, cyclopentane, cyclohexane, and cyclooctane; and aromatic hydrocarbon solvents, such as benzene, toluene, and xylene. Ether solvents are preferred and tetrahydrofuran is especially preferred. Where sodium, potassium, or lithium is used as the reducing agent, alcohol solvents are used. Suitable alcohol solvents are methanol, ethanol, propanol, isopropanol, butanol, and pentanol. Methanol and ethanol are preferred. The starting material, ethyl-β-santalate (cis and trans mixture) is generally used in the weight ratio of starting material to solvent of from about 1:5 to about 1:50, preferably from about 1:10 to about 1:20.

The temperature at which the reaction is run can range from about −50° to about 20° C., preferably from about −10° to about 5° C. The time of the reaction will be dependent upon the reactant concentrations and reaction conditions. The reaction is generally a rapid one requiring from about 5 minutes to about 2 hours, more normally about 30 minutes to about 1 hour. An inert atmosphere such as argon, nitrogen or helium is also used to protect the reactants from moisture. The order of addition of the reactants is not important. The solution containing the ester mixture, the cis- and trans-ethyl-β-santalates, is generally added to the solution containing the reducing agent as a convenience, although this is not necessary. Where desired a solution containing the reducing agent can be added to the ester.

The mixture of trans-β-santalol and cis-β-santalol has an odor characteristic of sandalwood oil and thus is useful in perfume compositions in which an odor characteristic of sandalwood oil is desired. The mixture can be used at a level of from about 0.0001 to about 50 percent of the perfume composition. The odor characteristics of the santalols are described in the *Givaudon Index*, pp. 322–323, Givaudon-Delawanna, Inc., New York (1961). The santalols are well known as components of natural sandalwood oil. The mixture is also useful in the reconstitution of natural sandalwood oil.

Where desired the mixture of the two isomers can be easily separated to obtain either trans-β-santalol or cis-β-santalol. This separation can be easily made by conventional methods, e.g., distillation or column chromatography.

The isomers themselves are also useful as perfume components having a sandalwood odor and can be used in perfume compositions at a level of about 0.0001 to about 50 percent of the perfume composition. The utility of the mixture of β-santalol and the cis and trans isomers of β-santalol will be apparent on examination of Examples II, III and IV given hereinafter.

The examples given hereinafter are merely illustrative of the process of this invention and the utility of the products produced thereby and are not intended to limit the spirit and scope of this invention.

EXAMPLE I

Preparation of endo-3-methyl-exo-3(cis-5'-hydroxy-4'-methylpent-3'-enyl)-2-methylene-bicyclo[2.2.1]heptane, cis-β-santalol, and of endo-3-methyl-exo-3(trans-5'-hydroxy-4'-methyl-pent-3'-enyl)-2-methylenebicyclo[2.2.1]heptane, trans-β-santalol.

GENERAL

Melting points were determined on a Thomas-Hoover capillary melting point apparatus or on a micro hot stage and are uncorrected; boiling points are uncorrected. Infrared spectra (ir) were recorded on a Perkin-Elmer Infracord spectrophotometer. Nuclear magnetic resonance spectra (nmr) were run as 10 percent solutions in carbon tetrachloride (unless stated otherwise) on a Varian A-60 or HA-100 spectrometer using tetramethylsilane as an internal reference. Chemical shifts are recorded as parts per million on the τ scale, coupling constants as Hertz. Nuclear magnetic resonance data are recorded in the order: chemical shift, multiplicity where $s$ = singlet, $d$ = doublet, $t$ = triplet, $q$ = quartet, $m$ = multiplet (coupling constant), integration (interpretation). Molecular weights were determined on a Bendix Model 12-100 Time-of-Flight mass spectrometer or on an Atlas CH-4 mass spectrometer. The following columns were employed for gas liquid phase chromatography (glpc): Column 1: 10 ft. × 0.25 in. stainless steel column packed with 20 percent silicone SF96 coated on 60/80 mesh Chromosorb W-HMDS; Column 2: 5 ft. × 0.25 in. stainless steel column packed with 20 percent FFAP on 60/80 mesh Chromosorb W-HMDS. Retention times are recorded relative to air.

A. Preparation of 3-methylbicyclo[2.2.1]heptan-2-one (Starting material)

2-Methylbicyclo[2.2.1]hept-2-ene as the starting material in the preparation of 3-methylbicyclo[2.2.1]-heptan-2-one was prepared according to the method of K. Alder and H. J. Ache, *Chem. Ber.*, 95, 503 (1962). The condensation of 80 g. of methylcyclopentadiene dimer and a large excess of ethylene afforded 38.0 g. (35.0 percent) of 3-methylbicyclo[2.2.1]hept-2-ene as a colorless liquid, b.p. 115°-117° C. (760 mm.) (spinning band). Gas chromatographic analysis on Column No. 1 at 85° C. with a helium flow of 60 ml./min. showed 2-methylbicyclo[2.2.1]hept-2-ene (96 percent).

To a suspension of 34.6 g. (0.202 mole) of m-chloroperbenzoic acid in 200 ml. of methylene chloride cooled to 8° C. was added dropwise over a one hour period a solution of 19.0 g. (0.176 mole) of 2-methylbicyclo-[2.2.1]hept-2-ene, prepared as above, in 100 ml. of methylene chloride. The temperature during the addition rose to 20° C. The reaction was stirred an additional 16 hours at 23°-26° C., then diluted with 350 ml. of diethyl ether. The organic layer was washed with a 10 percent sodium hydroxide (6 times with 100 ml.) solution, water (2times with 100 ml.), a saturated ferrous sulfate (100 ml.) solution, water (3 times with 150 ml.), and dried over magnesium sulfate. Evaporation of the solvents yielded 20.3 g. of a colorless liquid. Distillation from a Kontes short-path column gave 8.32 g. of a colorless liquid, b.p. 95° C. (100 mm.). Gas chromatographic analysis on Column No. 2 at 125° C. with a helium flow of 60 ml./min. showed the presence of endo-2-methyl-exo-2,3-epoxybicyclo-[2.2.1]heptane, relative retention time 9.25 min.

A solution of 5.0 g. (0.04 mole) of endo-2-methyl-exo-2,3-epoxybicyclo[2.2.1]heptane in 500 ml. of diethyl ether and 2 ml. (47 percent) of boron trifluoride in ether solution was stirred at 26° C., under a nitrogen blanket, for 17 hours. Ice water (25 ml.) was added dropwise over a 20 min. period. The layers were separated and the ethereal layer was washed with water (2 times with 100 ml.). The ethereal layer was dried over magnesium sulfate and the ether evaporated to yield 4.0 g. of a light yellow liquid. This liquid was dissolved in 10 ml. of hexane (b.p. 67° C.) and adsorbed on 20.0 g. of Woelm Activity 1 neutral alumina. Elution with 400 ml. of hexane gave 3.2 g. of a colorless liquid. Distillation from a Kontes short-path column yielded 2.2 g. (44 percent) of a colorless liquid, b.p. 56°-58° C. (5 mm.). Glpc analysis on Column No. 1 at 125° C. with a helium flow of 60 ml./min. showed endo-3-methylbicyclo[2.2.1]heptan-2-one (80 percent), relative retention time 9 min., 55 sec. The physical constants of a sample of endo-3-methylbicyclo-[2.2.1]heptan-2-one collected by preparative glpc under the above conditions were consistent with the reported literature values. The infrared showed $\lambda^{neat}$ 5.73 μ ( C = O); nmr (10% CCl$_4$); τ 9.01 and 9.08, d, $J$ = 7.0 Hz (endo-methyl protons).

B. Preparation of endo-3-methyl-exo-3[2'-(2,5-dioxacyclopentyl)ethyl]bicyclo[2.2.1]heptan-2-one - Step (1)

To a suspension of 1.74 g. (0.0725 mole) of sodium hydride in 10 ml. of xylene, under a nitrogen atmosphere, was added dropwise over a 20 minute period 5.0 g. (0.0404 mole) of endo-3-methylbicyclo[2.2.1]hepta-2-one prepared as above. This mixture was heated (90°-100° C.) with vigorous stirring for 4 hours. The temperature was raised to 130° C. (for 30 minutes) and 28.0 g. (0.188 mole) of 2-bromo-1(2,5-dioxacyclopentyl)ethane was added dropwise over a 25 min. period.

The 2-bromo-1(2,5-dioxacyclopentyl)ethane used above was prepared as follows: Anhydrous hydrogen bromide (454 g., 5.6 moles) was bubbled into 670 g. (10.8 moles) of ethylene glycol containing 146 g. (2.7 moles) of acrolein (under nitrogen) over a 4.5 hr. period, while the temperature was maintained at 26°-30° C. The reaction mixture was stirred an additional 15 hr. at 26° C., then extracted with 1.5 liters of petroleum ether (b.p. 41°-45° C.). The extracts were washed with a saturated sodium carbonate solution (2 times with 600 ml.), water (3 times with 100 ml.), dried over magnesium sulfate, concentrated, and distilled giving 281 g. (60 percent) of 2-bromo-1(2,5-dioxacyclopentyl)-ethane: b.p. 55°-58° C. (2.5 mm.); nmr (CCl$_4$) τ 5.2 (t, 1, J = 4.5 Hz,

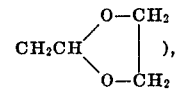

τ 6.24 (m, 4, acetal protons), τ 7.9 (m, 2, Br — CH$_2$).

The mixture containing the starting materials, 3-methylbicyclo[2.2.1]hepta-2-one, sodium hydride and 3-bromo-1(2,5-dioxacyclopentyl)ethane was stirred an additional 15 min. and cooled to 0° C. The excess sodium hydride was destroyed by the dropwise addition of water (20 ml.). The reaction mixture was diluted with 100 ml. of diethyl ether and the layers separated. The ethereal layer was washed with water (3 times with 40 ml.), dried over magnesium sulfate, concentrated, and distilled giving 4.113 g. (50 percent) of endo-3-methyl-exo-3[2'-(2,5-dioxacyclopentyl)ethyl]bicyclo[2.2.1hepta-2-one: b.p. 110°-115° C. (0.2 mm.); ir (film) 5.73 μ (C=O) and 8.8, 9.75 μ (acetal); nmr (CCl$_4$) τ 5.30 (5, 1 J = 4 Hz,

τ 6.22 (m, 4, acetal protons), τ 7.54 and τ 7.71 (broad s, 2, bridgehead protons), τ 9.06 (s, 3, endo—CH$_3$.

Anal Calcd. for C$_{13}$H$_{20}$O$_3$: C, 69.6; H, 8.9.
Found: C, 69.0; H, 9.2.

When in Step (1) above other strong bases, such as trityl sodium, trityl potassium, trityl lithium, potassium amide, lithium amide, sodium amide, potassium hydride, and lithium hydride, are substituted on an equivalent basis for the sodium hydride used, substantially similar results are obtained in that endo-3-methyl-exo-3[2'-(2,5-dioxacyclopentyl)ethyl]-bicyclo[2.2.1]heptan-2-one is prepared.

When in Step (1) above other anhydrous solvents, e.g., aromatic hydrocarbon solvents such as toluene, and benzene; ether solvents such as diethyl ether, dimethyl ether, methylethyl ether, dibutyl ether, 1,2-dimethoxy-ethane, tetrahydrofuran, and dioxane; and aliphatic hydrocarbon solvents such as pentane, hexane, heptane, octane, cyclopentane, cyclohexane, and cyclooctane; are substituted on an equivalent basis for the xylene used, substantially similar results are obtained in that endo-3-methyl-exo-3[2'-(2,5-dioxacyclopentyl)ethyl]bicyclo-[2.2.1]heptan-2-one is prepared.

When in Step (1) above exo-3-methylbicyclo[2.2.1]-heptan-2-one or a mixture of exo-3-methylbicyclo[2.2.1]-heptan-2-one and endo-3-methylbicyclo[2.2.1]heptan-2-one (e.g., in a 1:1, 2:1 or 1:2 ratio) is substituted on an equivalent basis for the endo-3-methylbicyclo[2.2.1]heptan-2-one used above, substantially equivalent results are obtained in that endo-3-methyl-exo-3[2'-(2,5-dioxacyclo-pentyl)ethyl]bicyclo[2.2.1] heptan-2-one is prepared.

C. Preparation of exo-2-endo-3-dimethyl-endo-2-hydroxy-exo-3(3'-oxopropyl)bicyclo[2.2.1]-heptane - Step (2)

To a solution of 1.0 g. (4.5 × 10⁻³ mole) of endo-3-methyl-exo-3[3'-(2,5-dioxacyclopentyl)ethyl]-bicyclo[2.2.1]hepta-2-one prepared as in Step (1) above in 10 ml. of diethyl ether (under a nitrogen atmosphere) was added dropwise over a 5 min. period 5.3 ml. (0.196 g., 9.0 × 10⁻³ mole) of a 1.7 M solution of methyllithium in diethyl ether. The reaction mixture was stirred for 2 hr. at 26° C., cooled to 0° C., and the excess methyllithium destroyed by the dropwise addition of water (10 ml.). An additional 40 ml. of ether was added, the ethereal layer washed with water (4 times with 25 ml.), the ether evaporated, and the residue dissolved in 40 ml. of tetrahydrofuran. A 10 percent sulfuric acid solution (25 ml.) was added to the solution and the mixture was heated at 57° C. for 16 hr. The solution was diluted with 100 ml. of water and the resulting oil extracted with petroleum ether (2 times with 50 ml.). The petroleum ether extracts were washed with water (3 times with 20 ml.), dried over magnesium sulfate, and concentrated to yield 321 mg. (81 percent) of crude exo-2-endo-3-dimethyl-endo-2-hydroxy-exo-3(3'-oxopropyl)bicyclo[2.2.1]heptane. Glpc analysis of this crude sample on Column No. 2 at 210° C. and a helium flow of 60 ml./min. showed one major peak. A sample corresponding to this peak was collected by preparative glpc and showed the following: ir (film) 2.9 $\mu$ (OH), 3.7 $\mu$ (aldehydic hydrogen), 5.81 $\mu$ (C = O); nmr $\tau$ 0.2 (t, 1, J = 2 Hz, aldehydic proton), $\tau$ 7.66 (t, 2, J = 8.0 Hz, CH$_2$—CHO), $\tau$ 8.09 (2, s-broad, bridgehead protons), $\tau$ 8.72 (s, C$_2$-exo-methyl protons), $\tau$ 9.12 (s, C$_3$-endomethyl protons).

When in Step (2) above, methylmagnesium bromide is substituted on an equivalent basis for the methyllithium used, substantially similar results are obtained in that exo-2-endo-3-dimethyl-endo-2-hydroxy-exo-3(3'-oxopropyl)-bicyclo[2.2.1]heptane is obtained.

When in Step (2) above, other anhydrous solvents, e.g., ether solvents such as diethyl ether, methylethyl ether, dibutyl ether, dimethyl ether, tetrahydrofuran, 1,2-dimethoxyethane and dioxane; aromatic hydrocarbon solvents such as benzene, toluene, and xylene; and aliphatic hydrocarbon solvents such pentane, hexane, heptane, octane, cyclopentane, cyclohexane, and cyclo-octane; are substituted on an equivalent basis for the diethyl ether used above, substantially similar results are obtained in that exo-2-endo-3-dimethyl-endo-2-hydroxy-exo-3(3'-oxopropyl)bicyclo[2.2.1]heptane is obtained.

D. Preparation of cis- and trans- exo-2-endo-3-dimethyl-endo-2-hydroxy-exo-3-(4'-carbethoxy-pent-3'-enyl)bicyclo[2.2.1]heptane - Step (3)

A solution of 1.86 g. (9.5 × 10⁻³ mole) of the crude reaction product, exo-2-endo-3-dimethyl-endo-2-hydroxy-exo-3(3'-oxopropyl)bicyclo[2.2.1]heptane, obtained from Step (2) in 5 ml. of ethanol was added to a solution of 5.5 g. (1.5 × 10⁻² mole) of (carbethoxyethylidene)-triphenylphosphorane in 40 ml. of ethanol and stirred for 6 hr. at 26° C. The ethanol was evaporated off and the resulting light yellow semi-solid triturated with petroleum ether (4 times with 75 ml.). The petroleum ether extracts were washed with water (3 times with 100 ml.), dried over magnesium sulfate, and concentrated to yield 2.04 g. of a light yellow liquid. Analysis by glpc of this crude liquid on Column No. 2 at 200° C. with a helium flow of 60 ml./min. showed exo-2-endo-3-dimethyl-endo-2-hydroxy-exo-3-(cis-4'-carbethoxypent-3'-enyl)bicyclo[2.2.1]heptane (13.6 percent), relative retention time 14.25 min., and exo-2-endo-3-dimethyl-endo-2-hydroxy-exo-3-(trans-4'-carbethoxypent-3'-enyl)bicyclo[2.2.1]-heptane (75.8 percent), relative retention time 24 min. Infrared analysis of the crude mixture showed absorption at 2.9 $\mu$ (OH), 5.90 $\mu$ (unsaturated ester C=O), 6.10 $\mu$ (C=C). This ester mixture was used without further purification in Step (4) to follow.

When in Step (3) above other solvents, e.g., chlorinated hydrocarbons such as methylene chloride, chloroform, carbon tetrachloride and 1,2-dichloroethane; alcohols such as ethanol, propanol, iso-propanol, butanol, and pentanol; polyols such as ethylene glycol, propylene glycol, and glycerol; and ether solvents such as diethyl ether, methylethyl ether, dimethyl ether, dibutyl ether, 1,2-dimethoxyethane, tetrahydrofuran, and dioxane; are substituted on an equivalent basis for the ethanol used above, substantially similar results are obtained in that cis- and trans- exo-2-endo-3-dimethyl-endo-2-hydroxy-exo-3(4'-carbethoxypent-3'-enyl)bicyclo[2.2.1]heptane is prepared.

E. Preparation of cis- and trans- endo-3-methyl-exo-3(4'-carbethoxypent-3'-enyl)-2-methylene-bicyclo[2.2.1]heptane — Step (4)

To a cooled (0° C.) solution of the crude reaction product containing the mixture of cis- and trans- exo-2-endo-3-dimethyl-endo-2-hydroxy-exo-3-(4'-carbethoxypent-3'-enyl)bicyclo[22.2.1]heptane, obtained from Step (3) above in 30 ml. of petroleum ether was added dropwise over a 15 min. period a solution of 3 ml. of thionyl chloride and 3.2 ml. of pyridine. The reaction mixture was stirred an additional 45 min. at 0° C., and the excess thionyl chloride destroyed by the dropwise addition of 25 ml. of water. The organic layer was separated, washed with water (25 ml.), and dried over magnesium sulfate. The solvent was evaporated, the residue was dissolved at 40 ml. of pyridine and the resulting solution was heated to 115.5° C. for 3 hours. The reaction mixture was cooled to 25° C. and diluted with 200 ml. of petroleum ether. The organic layer was washed with 10 percent hydrochloric acid (250 ml.) and water (3 times with 50 ml.) and dried over magnesium sulfate. Concentration and distillation yielded 710 mg. of a mixture of cis- and trans- endo-3-methyl-exo-3-(4'-carbethoxypent-3'-enyl)-2-methylenebicyclo-[2.2.1]heptane, b.p. 105°–115° C. (0.1 mm.). Analysis by glpc on Column No. 2 at 180° C. with a helium flow of 60 ml./min. showed endo-3-methyl-exo-3-(cis-4'-carbethoxypent-3'-enyl)-2-methylenebicyclo[2.2.1]heptane (12 percent) and endo-3-methyl-exo-3-(trans-4'-carbethoxypent-3'-enyl)-2-methylenebicyclo[2.2.1]heptane (52 percent).

A sample of the cis-ester collected by preparative glpc showed the following: infrared: $\lambda^{CH_2Cl_2}$ 5.89 $\mu$ (unsaturated ester carbonyl); $\lambda$ 6.08 and 11.35 $\mu$ (terminal olefin); nmr (10 percent in CCl$_4$); $\tau$ 4.28, t, J = 6.0 Hz, 1H (internal vinyl proton); $\tau$ 5.30, s, 1H and 5.55, s, 1H (terminal vinyl protons); $\tau$ 5.98, q, J = 7.0 Hz, 2H and $\tau$ 8.75, t, J = 7.0 Hz, 3H (ethyl ester protons); $\tau$ 7.3, s-broad (allyl bridgehead proton); $\tau$ 7.55, q, J = 7.0 Hz, 2H (allyl protons); $\tau$ 7.80, s-broad, 1H (bridgehead proton); $\tau$ 8.2, s (vinyl methyl protons); $\tau$ 8.98, s (endo-methyl protons).

Anal. Calcd. for C$_{17}$H$_{26}$O$_2$: C, 77.9; H, 10.0.
Found: C, 77.8; H, 10.1.

A sample of the trans-ester obtained in the same manner showed the following: infrared spectrum: $\lambda^{CH_2Cl_2}$ 5.89 $\mu$ (unsaturated ester carbonyl); 6.08 and 11.35 μ (terminal olefin); nmr (10 percent in CCl₄); τ 3.46, t, J = 8.0 Hz, 1H (internal vinyl proton); τ 5.35, s, OH and τ 5.62, s, 1H (terminal vinyl protons); τ 5.89, q, J = 7.0 Hz, 2H and τ 8.75, t, J = 7.0 Hz, 3H (ethyl ester protons); τ 7.39, s-broad, 1H (allyl bridgehead proton); τ 7.9, m overlapping with the bridgehead proton, 2H (allyl protons); τ 8.26, s (endo-methyl protons).

Anal. Calcd. for $C_{17}H_{26}O_2$: C, 77.9; H, 10.0.
Found: C, 77.4; H, 10.0.

When in Step (4) above other dehydrating agents, such as phosphorus oxychloride, aluminum oxide, sulfuric acid, and p-toluene sulfonic acid, are substituted on an equivalent basis for the thionyl chloride used above, and when in Step (4) above other anhydrous solvents, e.g., halogenated hydrocarbon solvents such as carbon tetrachloride, chloroform, and 1,2-dichloroethane; aromatic hydrocarbon solvents such as benzene, toluene, and xylene; and aliphatic hydrocarbon solvents such as pentane, hexane, heptane, octane, cyclopentane, cyclohexane, and cyclooctane; and ether solvents such as diethyl ether, methylethyl ether, dimethyl ether, dibutyl ether, 1,2-dimethoxyethane, and dioxane; are substituted on an equivalent basis for the methylene chloride used above, substantially similar results are obtained in that cis- and trans- endo-3-methyl-exo-3(4'-carbethoxypent-3'-enyl)-2-methylenebicyclo-[2.2.1]heptane is prepared.

When in Step (4) above, boron trifluoride in ether solvents such as diethyl ether, dimethyl ether, methylethyl ether, dibutyl ether, tetrahydrofurane, 1,2-dimethoxyethane, and dioxane, is substituted on an equivalent basis for the thionyl chloride used above and the reaction temperature increased to 25° C., substantially similar results are obtained in that cis- and trans- endo-3-methyl-exo-3(4'-carbethoxypent-3'-enyl)-2-methylenebicyclo[2.2.1]heptane are prepared.

F. Preparation of endo-3-methyl-exo-3(cis-5'-hydroxy-4'-methylpent-3'-enyl)-2-methylenebicyclo[2.2.1]-heptane, cis-β-santalol, and endo-3-methyl-exo-3-(trans-5'-hydroxy-4'-methylpent-3'-enyl)-2-methylene-bicyclo[2.2.1]heptane, trans-β-santalol - Step (5)

To a stirred suspension of 243 mg. (6.4 × 10⁻³ mole) of lithium aluminum hydride in 60 ml. of anhydrous diethyl ether at 0° C. and under a nitrogen atmosphere was added dropwise over a 30 min. period a solution of 1.4063 g. (5.7 × 10⁻³ mole) of the reaction product containing cis- and trans- endo-3-methyl-exo-3-(cis-4'-carbethoxypent-3'-enyl)-2-methylenebicyclo-[2.2.1]hexane obtained from Step (4) above in 40 ml. of diethyl ether. The reaction mixture was stirred an additional 45 min. at 0° C.; the excess lithium aluminum hydride was destroyed by the dropwise addition of 20 ml. of ice water. The layers were separated and the ethereal layer washed with water (3 times with 40 ml.), dried over magnesium sulfate, concentrated, and distilled giving 804 mg. (78 percent) of endo-3-methyl-exo-3-(cis-5'-hydroxy-4'-methylpent-3'-enyl)-2-methylenebicyclo[2.2.1]heptane, cis-β-santalol, and endo-3-methyl-exo-3-(trans-5'-hydroxy-4'-methylpent-3'-enyl)-2-methylenebicyclo[2.2.1]heptane, trans-β-santalol. Analysis by glpc on Column No. at 200° C. with a helium flow of 60 ml./min. showed cis-β-santalol (11.5 percent), relative retention time 4.66 min., and trans-β-santalol (65 percent), relative retention time 6.33 min.

A sample of cis-β-santalol collected by preparative glpc showed: infrared spectrum: $\lambda^{film}$ 2.93–3.1 μ (OH) and 6.08 and 11.4 μ (exo-cyclic olefin); nmr (10 percent in CCl₄); τ 4.6–4.9, m, 1 H (terminal vinyl proton); τ 5.37, s, 1 H and τ 5.6, s, 1 H (terminal vinyl protons); τ 6.0, s, 2 H (allyl-CH₂—OH protons); τ 7.39, s-broad, 1 H (allyl bridgehead protons); τ 7.8–8.1, m, 3 H (bridgehead proton overlapping with the allyl protons); τ 8.26, s (vinyl methyl protons); τ 8.95, s (endo-methyl protons).

Anal Calcd. for $C_{15}H_{24}O$: C, 81.8; H, 10.9.
Found: C. 81.7; H, 11.3.

A sample of trans-β-santalol collected by preparative glpc showed: infrared spectrum: $\lambda^{film}$ 2.9–3.1 μ (OH) and 6.08 and 11.4 (exo-cyclic olefin); nmr (10% CCl₄); τ 4.6–4.9, m, 1 H (internal vinyl proton); τ 5.37, s, 1 H and τ 5.61, s, 1 H (terminal vinyl protons) ; τ 6.20, s, 2 H (allyl-CH₂-OH); τ 7.40, s-broad, 1 H (allyl bridgehead proton); 7.8–8.0, m, (bridgehead proton overlapping with the allyl protons); τ 8.4, s (vinyl methyl protons) τ 8.95, s (endo-methyl protons).

Anal Calcd. for $C_{15}H_{24}O$: C, 81.8; H, 10.9.
Found: C, 81.4; H, 10.9.

When in Step (5) above other anhydrous solvents, e.g., ether solvents, such as methylethyl ether, dibutyl ether, tetrahydrofuran, 1,2-dimethoxyethane, and dioxane; aliphatic hydrocarbon solvents, such as pentane, hexane, heptane, octane, cyclopentane, cyclohexane, and cyclooctane; and aromatic hydrocarbon solvents such as benzene, toluene, and xylene, are substituted on an equivalent basis for the diethyl ether used above, substantially equivalent results are obtained in that endo-3-methyl-exo-3(cis-5'-hydroxy-4'-methylpent-3'-enyl)-2-methylenebicyclo[2.2.1]heptane and endo-3-methyl-exo-3(trans-5'-hydroxy-4'-methylpent-3'-enyl)-2-methylene-bicyclo[2.2.1]heptane are prepared.

When in Step (5) above sodium, lithium, or potassium is substituted on an equivalent basis for the lithium aluminum hydride used above and when alcohol solvents such as methanol, ethanol, propanol, iso-propanol, butanol and pentanol are substituted on an equivalent basis for the diethyl ether used above substantially similar results are obtained in that endo-3-methyl-exo-3-cis-5'-hydroxy-4'-methylpent-3'-enyl)-2-methylenebicyclo[2.2.1]heptane and endo-3-methyl-exo-3-(trans-5'-hydroxy-4'-methylpent-3'-enyl)-2-methylenebicyclo-[2.2.1]heptane are obtained.

EXAMPLE II

PERFUME COMPOSITIONS

Perfume compositions containing mixtures of the cis and trans isomers of β-santalol and containing cis-β-santalol and trans-β-santalol are prepared by intermixing the components shown below. The compositions exhibit highly desirable and useful odors.

COMPOSITION A

Sandal

| | |
|---|---|
| Mixture of cis- and trans-β-Santalol* | 40.0 |
| Geranium Bourbon | 15.0 |
| Vetivert | 3.0 |
| Patichouli | 1.0 |
| Olibanum | 1.0 |
| Coumarin | 2.5 |
| Citronellol | 15.0 |
| Phenyl Ethyl Alcohol | 7.5 |
| Musk Xylol | 0.6 |
| Musk Ambrette | 0.4 |
| Peru Balsam | 4.0 |
| Ambre Synthetic | 3.5 |
| Cassia | 1.0 |
| Cinnamic Alcohol | 0.5 |
| Jasmine Synthetic | 1.5 |
| Ionone α | 3.5 |
| | 100.0 |

* A mixture of the cis- and trans-isomers of β-santalol in a ratio of 1:5.6.

COMPOSITION B

Rose de Chine

| | |
|---|---|
| Geranium Bourbon | 20 |
| Geraniol | 30 |
| Rose Otto Synthetic | 4 |
| cis-β-Santalol | 3 |
| Patchouli | 8 |
| Cedarwood | 8 |
| Musk Xylol | 6 |
| Terpineol | 15 |
| Phenyl Ethyl Alcohol | 6 |
| | 100 |

COMPOSITION C

Chypre

| | |
|---|---|
| Oakmoss | 2.0 |
| Copaiba Balsam | 3.0 |
| trans-β-Santalol | 3.0 |
| Coumarin | 3.0 |
| Cedarwood | 6.0 |
| Peru Balsam | 3.0 |
| Terpineol | 55.0 |
| Musk Xylol | 3.0 |
| Patchouli | 1.5 |
| Vetivert | 1.5 |
| Bergamot | 7.0 |
| Musk Ambrette | 6.0 |
| Benzoin Resin | 6.0 |
| | 100.0 |

COMPOSITION D

Fougere

| | |
|---|---|
| Lavender Oil | 10 |
| Lavandin | 10 |
| Geranium Bourbon | 8 |
| Oakmoss | 4 |
| Coumarin | 6 |
| Patchouli | 3 |
| Cedarwood | 10 |
| cis- and trans-β-Santalol* | 12 |
| Methyl salicylate | 1 |
| Terpinyl acetate | 12 |
| Amyl Salicylate | 9 |
| Geraniol | 10 |
| Musk Xylol | 5 |
| | 100 |

\* Mixture of cis- and trans-isomers of β-santalol in a ratio of 1:1.

The components and proportions in the perfume compositions of this Example can be adjusted according to the methods well known in the perfume art to form a wide variety of desirable perfume compositions containing odoriferously effective amounts of these compounds.

EXAMPLE III

SOAP BAR COMPOSITIONS

A conventional household soap bar having the following composition is prepared:

| Component | Percent by Weight |
|---|---|
| Sodium soap | 75.0 |
| Potassium soap | 75.5 |
| (the total soap comprises a mixture of 80% tallow soap and 20% coconut soap) | |
| Water | 15.0 |
| Perfume composition A of Example II | 2.5 |
| TOTAL | 100.0 |

This soap bar exhibits a desirable sandal fragrance. Composition B, Composition C, or Composition D of Example II above can be substituted for Composition A in the above soap bar composition to obtain a rose de chine, chypre or fougere fragrance respectively.

EXAMPLE IV

DETERGENT COMPOSITIONS

A conventional granular, heavy-duty built detergent having the following composition is prepared:

| Component | Percent by Weight |
|---|---|
| Sodium dodecyl benzene sulfonate | 20.0 |
| Sodium tripolyphosphate | 50.0 |
| Sodium silicate (SiO$_2$:Na$_2$O ratio of 2:1) | 6.0 |
| Sodium sulfate | 14.0 |
| Water | 9.8 |
| Perfume Composition A of Example II | 0.2 |
| TOTAL | 100.0 |

The detergent composition exhibits a desirable sandal fragrance. Composition B, Composition C, Composition D of Example II can be substituted for Composition A in the above Example to obtain a rose de chine, chypre or fougere fragrance respectively.

What is claimed is:

1. A process for preparing β-santalol comprising the steps of
    1. admixing 3-methylbicyclo[2.2.1]heptan-2-one with a strong base selected from the group consisting of sodium amide, lithium amide, potassium amide, sodium hydride, lithium hydride, potassium hydride, trityl sodium, trityl potassium and trityl lithium and 2-bromo-1(2,5-dioxacyclopentyl)ethane at a temperature of from about 30° to 170° C. in an organic solvent in a 3-methylbicyclo[2.2.1]-heptan-2-one to a strong base molar ratio of from about 1:1 to 1:1.5 and a 3-methylbicyclo[2.2.1]-heptan-2-one to 2-bromo-1(2,5-dioxacyclopentyl)-ethane molar ratio of from about 2:1 to 1:5; to obtain endo-3-methyl-exo-3[2-(2,5-dioxacyclopentyl)-ethyl]bicyclo[2.2.1]heptan-2-one;
    2. admixing endo-3-methyl-exo-3[2-(2,5-dioxacyclopentyl)-ethyl]bicyclo[2.2.1]heptan-2-one of Step (1) with a methylmetallic compound selected from the group consisting of methyllithium and methylmagnesium bromide in a molar ratio of from about 1:1 to 1:5; in an anhydrous solvent at a temperature of from about 0° to 30° C.; and subsequently admixing the reaction product with an acidic aqueous solution to obtain exo-2-endo-3-dimethyl-endo-2-hydroxy-exo-3(3'-oxopropyl)bicyclo-[2.2.1]heptane;
    3. admixing exo-2-endo-3-dimethyl-endo-2-hydroxy-exo-3(3'[2.2.1]heptane of Step (2) with (carbethoxyethylidene)triphenyl phosphorane in a molar ratio of from about 1:1 to 1:5 at a temperature of from 0° to 50° C. in an organic solvent to obtain exo-2-endo-3-dimethyl-endo-2-hydroxy-exo-3-(trans-4'-carbethoxypent-3'-enyl)bicyclo[2.2.1]heptane and exo-2-endo-3-dimethyl-endo-2-hydroxy-exo-3-(cis-4'-carbethoxy-pent-3'-enyl)bicyclo[2.2.1]heptane;
    4. admixing exo-2-endo-3-dimethyl-endo-2-hydroxy-exo-3-(trans-4'-carbethoxypent-3'-enyl)bicyclo- [2.2.1]heptane and exo-2-endo-3-dimethyl-endo-2-hydroxy-exo-3-(cis-4'-carbethoxypent-3'-enyl)-bicyclo[2.2.1]heptane of Step (3) with a dehydrating agent selected from the group consisting of thionyl chloride, phosphorus oxychloride, boron trifluoride, aluminum oxide, sulfuric acid, and p-toluene sulfonic acid in a bicyclic compound to dehydrating agent molar ratio of from about 100:1 to 1:20 in an anhydrous solvent at a temperature of from about −20° to 50° C.; to obtain endo-3-methyl-exo-3-(trans-4'-carbethoxy-pent-3'-enyl)-2-methylenebicyclo[2.2.1]heptane and endo-3-methyl-exo-3-(cis-4'-carbethoxypent-3'-enyl)-2-methylenebicyclo[2.2.1]heptane; and
    5. admixing the endo-3-methyl-exo-3-(trans-4'-carbethoxypent-3'-enyl)-2-methylenebicyclo[2.2.1]-heptane and endo-3-methyl-exo-3-(cis-4'-carbethoxy-pent-3'-enyl)-2-methylenebicyclo[2.2.1]heptane of Step (4) with a reducing agent selected from the group consisting of lithium aluminum hydride, sodium in an alcohol solvent, potassium in an alcohol solvent, and lithium in an alcohol solvent, in a bicyclic compound to lithium aluminum hydride molar ratio of from about 1:0.20 to 1:0.5 or a bicyclic compound to sodium in alcohol, potassium in alcohol or lithium in alcohol molar ratio of from about 1:1 to 1:1.5; in an anhydrous solvent at a temperature of from about −50° to 20°C.; to obtain endo-3-methyl-exo-3-(trans-5'-hydroxy-4'-methylpent-3'-enyl)-2-methylenebicyclo[2.2.1]-heptane and endo-3-methyl-exo-3-(cis-5'-hydroxy-4'-methylpent-3'-enyl)-2-methylenebicyclo[2.2.1]-heptane;

wherein all five process steps are conducted in an inert atmosphere.

2. The process of claim 1
wherein, in Step (1), the strong base is sodium hydride or sodium amide;
wherein, in Step (2) the methylmetallic compound is methyllithium;
wherein, in Step (4), the dehydrating agent is thionyl chloride; and
wherein, in Step (5), the reducing agent is lithium aluminum hydride.

3. The process of claim 1
wherein, in Step (1), the 3-methylbicyclo[2.2.1]-heptan-2-one is dissolved in a solvent selected from the group consisting of aromatic hydrocarbon solvents, ether solvents, and aliphatic hydrocarbon solvents in a weight ratio of 2-methylbicyclo[2.2.1]heptan-2-one to solvent of from 1:2 to 1:10 and the 3-bromo-1(2,5-dioxacyclopentyl)ethane is dissolved in a solvent selected from the group consisting of aromatic hydrocarbon solvents, ether solvents, and aliphatic hydrocarbon solvents, in a weight ratio of 2-bromo-1(2,5-dioxacyclopentyl)ethane to solvent of from 1:2 to 1:10;
wherein, in Step (2), the endo-3-methyl-exo-3[2-(2,5-dioxacyclopentyl)ethyl]bicyclo[2.2.1]heptan-2-one is dissolved in a solvent selected from the group consisting of ether solvents, aromatic hydrocarbon solvents, and aliphatic hydrocarbon solvents in a weight ratio to the solvent of from 1:2 to 1:20;
wherein, in Step (3), the exo-2-endo-3-dimethyl-endo-2-hydroxy-3(3'oxopropyl)bicyclo[2.2.1]-heptane is dissolved in a solvent selected from the group consisting of chlorinated hydrocarbon solvents, alcohol solvents, polyol solvents, and ether solvents in a weight ratio to the solvent of from 1:2 to 1:20;
wherein, in Step (4), the exo-2-endo-3-dimethyl-endo-2-hydroxy-exo-3-(trans-4'-carbethoxypent-3'-enyl)bicyclo[2.2.1]heptane and exo-2-endo-3-dimethyl-endo-2-hydroxy-exo-3-(cis-4'-carbethoxypent-3'-enyl)bicyclo[2.2.1]heptane are dissolved in a solvent selected from the group consisting of chlorinated hydrocarbon solvents, aromatic hydrocarbon solvents, aliphatic hydrocarbon solvents, and ether solvents in a weight ratio to solvent of from 1:0.5 to 1:20; and
wherein, in Step (5), if the reducing agent is lithium aluminum hydride the endo-3-methyl-exo-3-(trans-4'-carbethoxypent-3'-enyl)-2-methylenebicyclo-[2.2.1]heptane and endo-3-methyl-exo-3(cis-4'-carbethoxypent-3'-enyl)-2-methylenebicyclo[2.2.1]-heptane are dissolved in a solvent selected from the group consisting of ether solvents, aliphatic hydrocarbon solvents, and aromatic hydrocarbon solvents in a weight ratio to solvent of from 1:5 to 1:50 and if the reducing agent is sodium in an alcohol solvent, potassium in an alcohol solvent, or lithium in an alcohol solvent, the endo-3-methyl-exo-3(trans-4'-carbethoxypent-3'-enyl)-2-methylenebicyclo[2.2.1]-heptane and endo-3-methyl-exo-3(cis-4'-carbethoxypent-3'-enyl)-2-methylenebicyclo[2.2.1]heptane are dissolved in the alcohol solvent of from 1:5 to 1:50.

4. The process of claim 3
wherein the aromatic hydrocarbon solvents are selected from the group consisting of benzene, xylene and toluene;
wherein the aliphatic hydrocarbon solvents are selected from the group consisting of pentane, hexane, heptane, octane, cyclopentane, cyclohexane and cyclooctane;
wherein the ether solvents are selected from the group consisting of dimethyl ether, diethyl ether, methylethyl ether, dibutyl ether, tetrahydrofuran, 1,2-dimethoxyethane and dioxane;
wherein the chlorinated hydrocarbon solvents are selected from the group consisting of methylene chloride, chloroform, carbon tetrachloride and 1,2-dichloroethane;
wherein the alcohol solvents are selected from the group consisting of methanol, ethanol, propanol, iso-propanol, butanol and pentanol; and
wherein the polyol solvents are selected from the group consisting of ethylene glycol, propylene glycol and glycerol.

5. The process of claim 4
wherein Step (1) is conducted at a temperature of from 80° to 130° C.;
wherein Step (3) is conducted at a temperature of 20° to 30° C.;
and
wherein Step (5) is conducted at a temperature of −10°C. to 5° C.

* * * * *

UNITED STATES PATENT OFFICE
CERTIFICATE OF CORRECTION

Patent No. 3,679,756          Dated July 25, 1972

Inventor(s) Herbert C. Kretschmar and William F. Erman

It is certified that error appears in the above-identified patent and that said Letters Patent are hereby corrected as shown below:

Column 3, line 25, delete the structure and insert therefor:

" 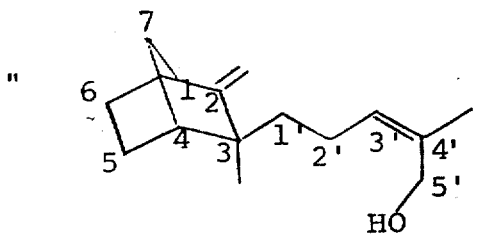 "

Column 16, line 40, "[22.2.1]" should read "[2.2.1].".

Column 17, line 60, "Column No.   " should read "Column No. 2".

Column 20, line 33, "3(3'[2.2.1]heptane" should read "3(3'-oxopropyl)bicyclo[2.2.1]heptane".

Signed and sealed this 1st day of May 1973.

(SEAL)
Attest:

EDWARD M. FLETCHER, JR.          ROBERT GOTTSCHALK
Attesting Officer                Commissioner of Patents